March 22, 1960     N. B. CHRISTENSEN     2,929,621
CONTROL DEVICE FOR VEHICLE PNEUMATIC SUSPENSION
Filed April 23, 1956     2 Sheets-Sheet 1
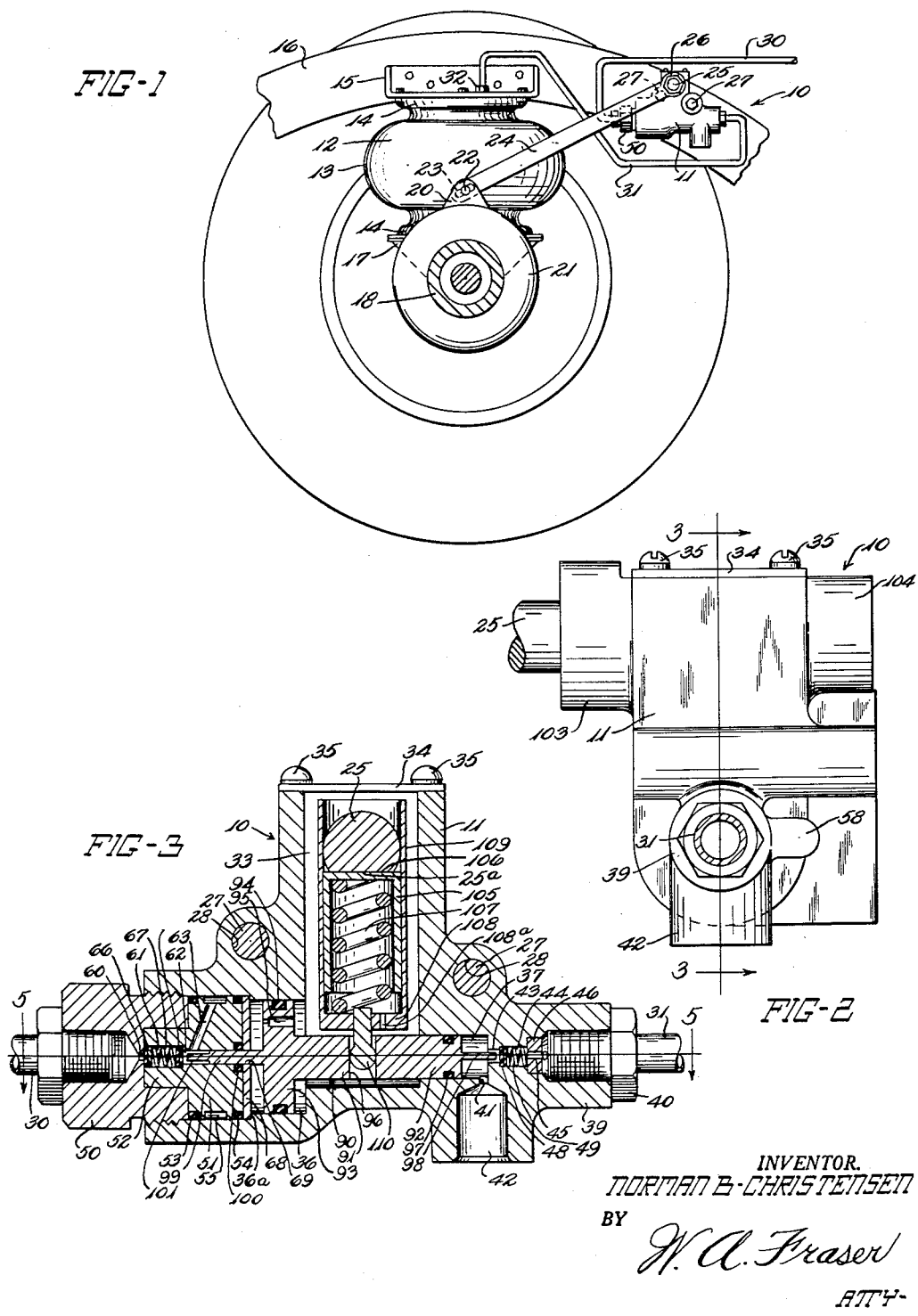
INVENTOR.
NORMAN B. CHRISTENSEN
BY
W. A. Fraser
ATTY.

March 22, 1960 N. B. CHRISTENSEN 2,929,621

CONTROL DEVICE FOR VEHICLE PNEUMATIC SUSPENSION

Filed April 23, 1956

INVENTOR.
NORMAN B. CHRISTENSEN
BY
W. A. Fraser
ATTY.

United States Patent Office 2,929,621
Patented Mar. 22, 1960

2,929,621

CONTROL DEVICE FOR VEHICLE PNEUMATIC SUSPENSION

Norman B. Christensen, North Olmsted, Ohio

Application April 23, 1956, Serial No. 579,907

2 Claims. (Cl. 267—65)

This invention relates generally to suspension systems for vehicles. More particularly, the invention relates to pneumatic suspension systems and provides means whereby pneumatic devices, such as bellows type air springs, may be made to respond to increased or decreased vehicle loads causing a substantial change in the riding level of the vehicle, and yet prevent unnecessary alteration of the riding level when the vehicle road gear passes over a bump or drops into a hole, which actions only momentarily alter the load on the suspension system.

Pneumatic suspension systems, incorporating air springs interposed between the vehicle frame and road or running gear, have been slow to achieve commercial success because they have not been provided with satisfactory valve means for controlling and regulating the air cushion within the air springs to maintain a predetermined height between the road and gear and frame of the vehicle. Maintaining a constant average air spring length or air cushion under variable static load conditions, will provide a constant riding level for the vehicle.

A satisfactory valve means for effectively controlling the riding level of a vehicle having an air spring suspension, must be responsive to changing static load conditions. An increase in the load will compress the air spring. To restore the air spring to its initial position, air under increased pressure must be admitted into the air spring. A decrease in load will cause the air spring to extend or raise, and therefore, air must be exhausted or vented from within the air spring to restore it to its initial position.

In addition to controlling the supply and exhaust of air to and from an air spring, a satisfactory valve control means must embody therein a determinable time delay so that momentarily alteration of the static load on the suspension system, such as would be encountered during normal axle movement due to road irregularities, will not cause the valve to supply or exhaust air. This time delay feature is often referred to as "damping" and preferably is selected so as to be operable within a time range of from 1 to 20 seconds, as determined by the make and type of the vehicle, the anticipated loading and road conditions, etc.

The operation of the valve means also must not be influenced by the natural frequency of the vehicle suspension system which will probably be in the range of 1 to 2 cycles per second.

Lastly, a satisfactory valve and its control means must be unaffected by and remain operative under extremes of temperature, humidity and exposure to sand, dirt, grease, oil and water.

It is therefore an object of this invention to provide an improved pneumatic suspension system for vehicles, which system includes improved valve and valve control means for controlling and regulating air springs interposed between the vehicle frame and road gear, so as to furnish a constant riding level for the vehicles and a constant average air spring length.

Another object is to provide an improved valve and control means for control and regulation of a vehicle air spring suspension, which controls the supply and exhaust of air to the air springs, has a determinable time delay or "damping" feature, and is operative under extremes of temperature, humidity and other environmental conditions.

A further object is to provide an improved valve and control means located remotely of the air springs and embodying therein a determinable time delay or damping component to prevent excessive operation of the valve, which is accurately responsive to persistent changes in vehicle loading, and which is of simple, relatively uncomplex construction.

These and other objects will be apparent in view of the following detailed description of the invention considered with the attached drawings:

In the drawings:

Fig. 1 is a vertical sectional view through a vehicle axle showing in elevation a portion of the vehicle equipped with a pneumatic suspension system according to the invention;

Fig. 2 is an end elevation of the valve and control means according to the invention;

Fig. 3 is a sectional view taken substantially on line 3—3 of Fig. 2, and rotated 90°;

Figure 4:
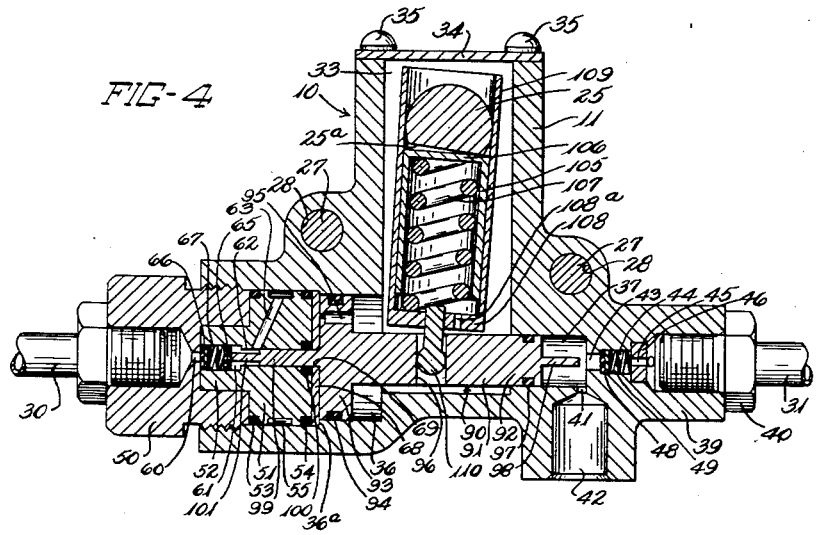
Fig. 4 is a view, similar to Fig. 3, showing the control device in the air supply position.

In the present invention a ride control valve means, indicated generally by the numeral 10, includes a housing 11 which carries a damping means, and an air supply and exhaust control means. The housing 11 is located remotely and laterally of a conventional air spring bellows 12, of multi-ply rubber and cord construction having one or more convolutions 13. The upper end of the air spring is hermetically fastened by a suitable clamp ring 14 to the underside of a horizontal transverse member 15 constituting a portion of the vehicle frame. The member 15 is securely affixed at either end to longitudinal frame members 16. The lower end of the air spring 12 is also hermetically fastened by a similar clamp ring 14 to the upper side of a bracket 17 on the axle housing 18 of the vehicle road gear. One mode of interposing an air spring between a vehicle frame and road gear has been shown and described. It will be understood, however, that the principles of the invention are applicable to air springs interposed in other ways between the vehicle frame and road gear. Also, only one air spring has been shown in connection with this invention, but it will be understood that the invention may be utilized with as many air springs as are required on a vehicle.

A stub flange 20 which may be located atop the vehicle differential housing 21, has a bolt 22 therethrough, which bolt extends through an elongated longitudinal slot 23 formed in the lower end of a control valve actuating rod 24, so that rod 24 is slidably mounted on bolt 22. The upper end of the actuating rod is fixed to one end of a control valve actuating shaft 25 and secured thereon by a nut 26, said shaft being mounted for rotation in housing 11 in a manner to be described. The housing 11 preferably is located above the horizontal plane of the axle, and is fastened by bolts 27, extending through holes 28 in the housing 11 to a longitudinal frame member 16.

Air, from a source under pressure (not shown) is supplied to the control device 10 by suitable piping 30. The control device is connected by suitable piping 31 to an air spring fitting 32, which extends through the frame member 15 into the interior of the air spring. The piping 31 is the conduit for supplying air to and exhausting air from the air spring 12, through the control device 10, as referred to later.

Figure 5:
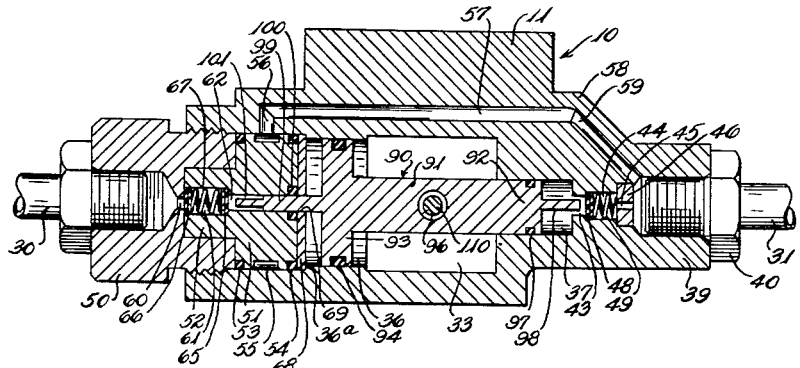
Fig. 5 is a sectional view taken downward substantially on line 5—5 of Fig. 3.

Referring to Figs. 3, 4 and 5, the housing 11 is provided with a substantially vertical central bore 33 that extends part way through the housing and is tightly closed at the top with a plate 34 and bolts 35. The bore 33 is preferably substantially square in shape. Adjacent the bottom of the bore, a large circular bore or chamber 36 extends laterally and horizontally to one end of the housing. The bores 33 and 36 are each substantially filled with a suitable fluid, such as hydraulic brake fluid. Opposite of bore 36, a smaller circular bore or chamber 37 extends laterally and horizontally of the bore 33 and terminates short of the other end of the housing.

At the end of the housing 11 toward which bore 37 is directed is a two-way bellows port 39. A fitting 40 connected to the piping 31 communicating with the air spring 12 is threaded into the port 39. Below the bellows port 39, and communicating with the outer end of the bore 37 through a short passage 41, is an exhaust port 42.

The bore 37 communicates with the bellows port 39 through a smaller diameter orifice 43 and an enlarged diameter valve chamber 44, in the housing 11, and a smaller diameter orifice 45 in a valve spring seat plug 46 fitted in the inner end of the bellows port 39. To control passage of exhaust air from the bellows port 39, as referred to below, into the bore 37, a valve 48 is seated at the inner end of chamber 44, normally closing orifice 43. Valve 48 is in the form of a flat, reinforced air impermeable disc, and a small coil spring 49, bearing between the valve and the plug 46 has a normal bias tending to keep the valve seated. Valve 48 is suitably shaped to cover orifice 43 when seated, and may be square, hexagonal, star shaped, round, or any other shape that will permit the passage of air around the valve.

Threaded into the outer end of the bore 36 is an air supply fitting 50, to which the piping 30 communicating with the air supply is adapted to be tightly secured. Inwardly of the fitting 50, bore 36 has mounted therein a valve ring 51 having an outwardly extending hub portion 52 that fits snugly within the shank portion of fitting 50. O-rings 53 and 54 are carried at the outer peripheries of the valve ring to provide a fluid tight seal.

Between the O-rings 53 and 54, the outer surface of the valve ring 51 has an annular passage 55. The passage 55 communicates with a short lateral passage 56 (Fig. 5) that leads to one end of an elongated passageway 57 extending transversely of the housing 11 within a lateral extension 58 of the housing (Fig. 2). The other end of passageway 57 communicates with a diagonal passage 59 that opens into the bellows port 39. The passages 56, 57 and 59, together with bore 37 and passage 40, define the conduits through which air passes interiorly of the housing and through the bellows port to the air spring 12.

The air supply piping 30 communicates with the interior of the housing 11 through a small diameter orifice 60 in the end wall of fitting 50, and enlarged diameter valve chamber 61 within the valve ring 51, a smaller diameter bore 62 extending axially through the valve ring and opening into the bore 36, and a diagonal bore 63 (Figs. 3 and 4) communicating with the axial bore 62 and opening into the annular passage 55.

To control passage of compressed air from the piping 30 to the bellows port 39, and thence to the air spring 12 as referred to below, a valve 65 is seated at the inner end of chamber 61, normally closing the outer end of the axial bore 62. To check loss of air pressure from the air spring in the event that the pressure in the air piping drops below that of the air spring, a check valve 66 is seated at the outer end of chamber 61 closing the inner end of the bore 60. The valves 65 and 66 are similar to valve 48 and a small coil spring 67 bearing between the valves within chamber 61 has a normal bias tending to keep them seated.

Inwardly of the valve ring 51, the bore 36 is preferably provided with a ledge 36a. A spacer ring 68, having a bore 69 therethrough in concentric alignment with bore 62, as referred to below, may be positioned between the ledge 36a and the valve ring so as to accurately maintain the valve ring in its desired position within bore 36 and in relation to the fitting 50.

The valves 48 and 65 are selectively unseated, to exhaust air from or admit air to the air spring 12 as referred to below, by the movement interiorly of the housing 11 of a valve actuating plunger, indicated generally by the numeral 90. The plunger 90 includes a central rod-like portion 91 extending transversely across the lower end of the vertical bore and having an end 92 slidably received in the bore 37, and having the other end supported by a piston 93. The piston 93 is movable within bore 36 and is fitted with a peripheral O-ring 94 to provide a fluid tight seal. As shown in Figs. 3 and 4, the piston 93 is also provided with a small diameter chamber and orifice 95 to permit regulated transfer of hydraulic fluid from one side of the piston to the other, as described below. Approximately mid-way of the vertical bore 33, the rod-like portion 91 of the plunger has a small vertical bore 96 for connecting the plunger 90 with the actuating means, also described below.

The plunger end 92 within the inner end of bore 37 is provided with an O-ring 97 to provide a seal against the entrance into bore 37 of hydraulic fluid in bores 33 and 36. Extending outwardly of the end 92 is a valve operating stem 98, adapted to enter orifice 43 and unseat valve 48. The other end of the plunger 90 has a reduced diameter rod portion 99 extending outward of the piston head 93, through bore 69 in the spacer ring 68, and being slidably received in the axial bore 62 of the valve ring 51. The inner end of the axial bore 62 is provided with an O-ring 100 surrounding the rod portion 98 and to provide a seal against the entrance into bore 62 of the hydraulic fluid in bores 33 and 36. The rod portion terminates within the bore 62, inwardly of the diagonal bore 63 and has a reduced diameter valve operating stem 101 adapted to unseat valve 65.

Axial movement of the plunger 90, so as to open valves 48 or 65, is accomplished by mechanism actuated by shaft 25. Referring to Fig. 2, the end of shaft 25 fastened to the actuating rod 24 is journaled for rotation in a boss 103. The other end of the shaft is journaled in a similar boss 104. Both ends of shaft 25 are round so as to rotate freely in its bearings. However, within the bore 33 (Figs. 3 and 4), the shaft is generally semi-circular in section having a flattened lower surface 25a.

Within the fluid filled bore 33 is a plunger cup 105, having a closed upper end 106 which contacts shaft 25 and is normally (as shown in Fig. 3) held against the flattened surface 25a. Placed within cup 105 so as to contact the inner surface of the cup end 106, is a coiled compression, shaft follower spring 107, the lower end of which extends below the open end of the plunger cup, into engagement with the closed lower end 108 of a shaft follower cup 109, vented as at 108a. The follower cup 109 is rotatably suspended from the shaft 25 and has an extension 110 at the base thereof adapted to be received within bore 96 in the plunger 90.

The operation of the control device 10 is as follows:

Assume that the normal static load on the vehicle suspension requires that the air spring 12 be inflated to a pressure of about 50 p.s.i. At this pressure, valve 48 will be seated against orifice 43 by spring 49, and valve 65 will be seated against bore 62 by spring 66.

Now then, assume that the static load is increased, for example, by adding merchandise or passengers to the vehicle. As the load is increased, the upper frame members 15 and 16 move downwardly toward the axle housing 18, causing the air spring 12 to contract. During this downward movement of the upper frame members, the control device 10 also moves downwardly. Such downward movement of the control device causes the actuating shaft 25 to be turned by the actuating rod 24, the lower end of which is slidably attached to the differential housing 21, to permit sliding movement of the rod as the control device moves downwardly. That is, as the distance between the members 15 and the axle housing 18 decreases, the rod 24 will cause the shaft 25 to be rotated within the bore 33.

As viewed in Fig. 1, an increased load will cause the shaft 25 to rotate in a clockwise direction to supply air under pressure into the air spring 12. As shaft 25 is turned clockwise on its axis from its normal position (Fig. 3), the plunger cup 105 will be displaced downwardly within the follower cup 109, compressing further the spring 107 (Fig. 4). As the spring 107 is compressed, energy stored therein becomes directed substantially, equally between the upper end 106 of the plunger cup and the lower end 108 of the follower. The plunger end is fixed by the shaft and cannot be displaced upwardly, though it will immediately move upwardly in the event shaft 25 is turned back even a small degree in a counter-clockwise direction. As the spring 107 is compressed by the downward movement of the plunger cup 105, the follower cup 109 will be caused to oscillate on the same axis as shaft 25 to assume the position shown in Fig. 4. As the follower cup turns, the extension 110 within bore 96 will move the plunger 90 to the left in bore 36.

As described above, the bore 36 (and 33) is liquid filled. As the piston 93 moves to the left, for example from its Fig. 3 position to its Fig. 4 position, liquid is transferred through the orifice 95 from the side of the piston facing the valve ring 51 to the side facing bore 37. The speed or rate of such transfer, and thus the speed of the horizontal movement of the plunger 90, is determined and regulated by the size of orifice 95.

As the plunger 90 moves to the left in Fig. 4, so does the rod 99 with its reduced stem 101, causing valve 65 to be unseated, valve 66 also being unseated by the pressure of the air in the supply line 30, allowing additional air to pass into the axial bore 62, and then through the various passages to the air spring 12. This additional air must be under a greater pressure than the air already in the air spring 12, and will extend the air spring to its initial position.

As the air spring extends, the frame members 15 and 16 move upwardly from the axle housing 18, causing shaft 25 to be turned by the actuating rod in a counter-clockwise direction as viewed in Fig. 4. As shaft 25 begins to assume the normal position shown in Fig. 3, the follower spring 107 will urge the plunger cup 105 upwardly, which action permits the follower cup 109 to begin to assume its normal position. The force which has been directing piston 93 to the left is reversed in direction, the flow of liquid through orifice 95 also being reversed. This action moves the plunger 90 to the right and allows spring 66 to close valve 65, stopping the flow of additional air and maintaining the original position of the air spring.

If the static load on the vehicle suspension is decreased, the frame members 15 and 16 move upwardly away from the axle housing 18, causing the air spring to extend. During this upward movement of the frame members, the control device 10 also moves upwardly, causing shaft 25 to be turned by rod 24, in a counter-clockwise direction as viewed in Fig. 3, said rod sliding with respect to the bolt 22 as the device 10 moves upwardly.

As the shaft 25 is turned counter-clockwise on its axis, the ensuing action is similar but in the opposite direction to that described in connection with Fig. 4. That is, the follower cup 109 is oscillated on the same axis as shaft 25 and the extension 110 moves the plunger 90 to the right as viewed in Fig. 3. This displaces fluid from the side of the piston 93 facing bore 37, through the orifice 95, to the side of the piston facing the valve ring 51.

As the plunger 90 moves to the right in Fig. 3, so does the plunger end 92 with its reduced stem 98, causing valve 48 to be unseated and permitting air to pass from the air spring 12 into bore 37, through passage 41 to the exhaust port 42, and then to the atmosphere. The exhaust of air from within the air spring 12 will contract the air spring to its initial position.

As the air spring contracts, the frame members 15 and 16 move downwardly toward the axle housing 18, causing shaft 25 to be turned by rod 24 in the clockwise direction as viewed in Fig. 3. The ensuing action is similar to that described in connection with Fig. 4. That is, the force moving follower cup 109 is reversed in direction, the piston 93 is moved to the right and the flow of fluid through the orifice 95 is also reversed. This action allows spring 49 to close valve 48, stopping the exhaust of air and maintaining the original position of the air spring.

When a vehicle equipped with a suspension system according to the invention is driven over rough roads with no change in the static loading, the vehicle wheels tend to move up and down over bumps and into holes in the road. This causes the shaft 25 to be quickly turned in either direction as the case may be. However, a quick turning of shaft 25 will not cause the various components of the control device 10 to react to supply or exhaust air because of the damping or time delay effect of the piston 93 upon movement of the plunger 90. Thus, the admission of additional air to or exhaust of air from the air spring 12 will not occur until a force is maintained in one direction for a predetermined period of time which is selected by the size of the orifice and chamber 95. It will be found desirable to select an orifice opening 95 which will provide a time lag of about 7 seconds before the follower cup 109 will move from the normal or middle position shown in Fig. 3, to either of its displaced positions, one of which is shown in Fig. 4. However, the time delay may be selected from any place within the preferred range of from 1 to 20 seconds.

A shut off valve (not shown) can be provided in the air spring line 31 so that a mechanic can shut off the line when raising the vehicle by a bumper jack to remove a tire.

While a preferred embodiment of the invention has been shown and described, it will be understood that changes and modifications may be made therein without departing from the spirit of the invention or the scope of the subjoined claims.

What is claimed is:

1. Control means adapted for regulation of the supply and exhaust of air to and from an expansible bellows for a vehicle suspension system to maintain a predetermined height between the road gear and frame of the vehicle, comprising: a housing having a normally vertical bore containing fluid and communicating at its lower end with a cylindrical horizontal chamber, said chamber having a larger diameter bore containing fluid on one side of said vertical bore and a smaller diameter bore on the other side of said vertical bore; a supply port opening exteriorly of said larger bore, a two-way port adapted for communication with a bellows opening exteriorly of said smaller bore; an exhaust port opening exteriorly of said smaller bore adjacent said two-way port; a valve ring fitted within the outer end of said larger bore having an interior passage in communication with said supply port; passageways interiorly of said housing and said valve ring connecting said supply port with said two-way port; a first valve controlling the flow of air between said supply port and two-way port; a second valve controlling the flow of air between said two-way port and said exhaust port; a movable plunger extending axially of said chamber to selectively open said valves, said plunger having sealing means associated therewith to deny passage of fluid into contact with said valves; a piston fitted transversely of said plunger within said larger bore with said fluid in said larger bore on opposite sides of said piston, said piston having a fluid transfer orifice therethrough; a shaft extending transversely of said vertical bore adapted for rotation by relative movement between the road gear and frame of the vehicle; and, an oscillatable actuating member operatively connecting said shaft with said plunger to move said plunger axially, the rate of axial movement of said plunger in response to rotation of said shaft being regulated by the size of the orifice in said piston.

2. Control means adapted for regulation of the supply and exhaust of air to and from an expansible bellows for a vehicle suspension system to maintain a predetermined height between the road gear and frame of the vehicle, comprising: a housing having a normally vertical bore containing fluid and communicating at its lower end with a cylindrical horizontal chamber, said chamber having a larger diameter bore containing fluid on one side of said vertical bore and a smaller diameter bore on the other side of said vertical bore; a supply port opening exteriorly of said larger bore; a two-way port adapted for communication with a bellows opening exteriorly of said smaller bore; an exhaust port opening exteriorly of said smaller bore adjacent said two-way port; a valve ring fitted within the outer end of said larger bore having an interior passage in communication with said supply port; passageways interiorly of said housing and said valve ring connecting said supply port with said two-way port; a first valve controlling the flow of air between said supply port and two-way port; a second valve controlling the flow of air between said two-way port and said exhaust port; a movable plunger extending axially of said chamber to selectively open said valves, said plunger having sealing means associated therewith to deny passage of fluid into contact with said valves; a piston fitted transversely of said plunger within said larger bore with said fluid in said larger bore on opposite sides of said piston, said piston having a fluid transfer orifice therethrough; a shaft extending transversely of said vertical bore adapted for rotation by relative movement between the road gear and frame of the vehicle, said shaft having a flattened surface directed toward said plunger; a shaft follower cup suspended from said shaft operatively connected to said plunger to move said plunger axially; an inner cup telescoping within said follower cup and adapted for contacting said flattened shaft surface; and a spring means interposed between said inner cup and follower cup urging said inner cup toward said shaft, the rate of axial movement of said plunger in response to rotation of said shaft being regulated by the size of the orifice in said piston.

References Cited in the file of this patent

UNITED STATES PATENTS

| | | |
|---|---|---|
| 2,075,600 | Baker | Mar. 30, 1937 |
| 2,656,854 | Douglas | Oct. 27, 1953 |
| 2,670,201 | Rossman | Feb. 23, 1954 |
| 2,674,266 | Gardner | Apr. 6, 1954 |
| 2,774,376 | Young | Dec. 18, 1956 |

FOREIGN PATENTS

| | | |
|---|---|---|
| 553,603 | Great Britain | May 28, 1943 |